US009524707B2

(12) United States Patent
Urry et al.

(10) Patent No.: US 9,524,707 B2
(45) Date of Patent: Dec. 20, 2016

(54) PROGRAMMABLE MUSICAL INSTRUMENT PEDALBOARD

(71) Applicant: Harman International Industries, Inc., Stamford, CT (US)

(72) Inventors: Robin M. Urry, Draper, UT (US); John D. Hanson, West Jordan, UT (US); James D. Pennock, Salt Lake City, UT (US); James E. Lambrick, Sandy, UT (US); William E. Clements, Salt Lake City, UT (US)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 14/621,860

(22) Filed: Feb. 13, 2015

(65) Prior Publication Data

US 2015/0154948 A1 Jun. 4, 2015

Related U.S. Application Data

(63) Continuation of application No. 13/916,310, filed on Jun. 12, 2013, now Pat. No. 8,957,297.

(60) Provisional application No. 61/658,707, filed on Jun. 12, 2012.

(51) Int. Cl.

| | |
|---|---|
| ***G01P 3/00*** | (2006.01) |
| ***G10H 1/02*** | (2006.01) |
| ***G10H 7/00*** | (2006.01) |
| ***G10H 1/06*** | (2006.01) |
| ***G10H 1/34*** | (2006.01) |

(52) U.S. Cl.
CPC ................ *G10H 1/06* (2013.01); *G10H 1/348* (2013.01); *G10H 2220/116* (2013.01)

(58) Field of Classification Search
CPC .............. G10H 2220/096; G10H 3/186; G10H 2230/015; G10H 1/06; G10H 1/348; G10H 2220/116; H03F 1/327
USPC ................................... 84/225, 721, 744, 746
See application file for complete search history.

(56) References Cited

U.S. PATENT DOCUMENTS

| | | | | |
|---|---|---|---|---|
| 5,789,689 | A * | 8/1998 | Doidic et al. | 84/603 |
| 5,848,164 | A | 12/1998 | Levine | |
| 5,866,829 | A * | 2/1999 | Pecoraro | 84/177 |
| 6,215,055 | B1 * | 4/2001 | Saravis | 84/422.1 |
| 6,380,474 | B2 | 4/2002 | Taruguchi et al. | |

(Continued)

FOREIGN PATENT DOCUMENTS

| | | |
|---|---|---|
| GB | 2387015 A | 10/2003 |
| WO | 2009012533 A1 | 1/2009 |
| WO | 2010148227 A1 | 12/2010 |

OTHER PUBLICATIONS

"Hands on With GarageBand for iPhone," Chris Foresman, arstechnica.com, Nov. 7, 2011, 13 pages.*

(Continued)

*Primary Examiner* — Jeffrey Donels
(74) *Attorney, Agent, or Firm* — Brooks Kushman P.C.

(57) ABSTRACT

In one embodiment, a programmable pedalboard for a musical instrument is provided. The pedalboard includes a docking station for receiving a removable portable computer that provides a plurality of instrument effects. The docking station is configured to receive an audio signal from a musical instrument and to modify the audio signal from the musical instrument based on at least one instrument effect from the plurality of instrument effects.

21 Claims, 8 Drawing Sheets

(56) References Cited

U.S. PATENT DOCUMENTS

| | | | | |
|---|---|---|---|---|
| 6,423,892 | B1 | 7/2002 | Ramaswamy | |
| 6,664,460 | B1 * | 12/2003 | Pennock et al. | 84/662 |
| 7,005,571 | B1 * | 2/2006 | Groff | 84/645 |
| 7,332,670 | B2 | 2/2008 | Fujiwara et al. | |
| 7,608,776 | B2 | 10/2009 | Ludwig | |
| 7,678,985 | B2 * | 3/2010 | Adams et al. | 84/645 |
| 7,754,956 | B2 | 7/2010 | Gain et al. | |
| 7,990,366 | B2 | 8/2011 | Logue | |
| 8,093,486 | B2 | 1/2012 | Behringer et al. | |
| 8,180,063 | B2 | 5/2012 | Henderson | |
| 8,891,791 | B2 * | 11/2014 | Olswang et al. | 381/119 |
| 8,957,297 | B2 * | 2/2015 | Urry et al. | 84/721 |
| 2002/0005111 | A1 | 1/2002 | Ludwig | |
| 2002/0065568 | A1 | 5/2002 | Silfvast et al. | |
| 2003/0196542 | A1 * | 10/2003 | Harrison, Jr. | 84/737 |
| 2004/0016338 | A1 | 1/2004 | Dobies | |
| 2004/0159222 | A1 | 8/2004 | Pennock et al. | |
| 2004/0203415 | A1 | 10/2004 | Wu | |
| 2006/0011052 | A1 | 1/2006 | Purchon et al. | |
| 2006/0117105 | A1 | 6/2006 | Lesenne et al. | |
| 2006/0159291 | A1 * | 7/2006 | Fliegler et al. | 381/118 |
| 2006/0221776 | A1 * | 10/2006 | Roman et al. | 369/1 |
| 2006/0248447 | A1 | 11/2006 | Makkonen | |
| 2007/0234880 | A1 * | 10/2007 | Adams et al. | 84/601 |
| 2007/0234888 | A1 | 10/2007 | Rotolo de Moraes | |
| 2008/0165989 | A1 * | 7/2008 | Seil et al. | 381/119 |
| 2009/0154722 | A1 * | 6/2009 | De Jong et al. | 381/77 |
| 2009/0183625 | A1 * | 7/2009 | Sanders | 84/626 |
| 2010/0169775 | A1 * | 7/2010 | Quandt et al. | 715/716 |
| 2010/0269670 | A1 | 10/2010 | O'Connor et al. | |
| 2011/0004328 | A1 * | 1/2011 | Darcey et al. | 700/90 |
| 2011/0093888 | A1 | 4/2011 | Araki et al. | |
| 2011/0093889 | A1 | 4/2011 | Araki et al. | |
| 2011/0093890 | A1 | 4/2011 | Araki et al. | |
| 2011/0137754 | A1 | 6/2011 | Fernandez | |
| 2011/0299238 | A1 * | 12/2011 | Radin et al. | 361/679.41 |
| 2012/0160079 | A1 * | 6/2012 | Little et al. | 84/613 |
| 2012/0297962 | A1 | 11/2012 | O'Donnell et al. | |
| 2013/0132509 | A1 | 5/2013 | Styles | |
| 2013/0154920 | A1 * | 6/2013 | Radin et al. | 345/156 |
| 2013/0201398 | A1 * | 8/2013 | Radin et al. | 348/552 |
| 2013/0312588 | A1 * | 11/2013 | Orshan | 84/609 |

OTHER PUBLICATIONS

"Line 6 Mobile in app turns your iPad or iPhone into a multi-effect amp—party on, Wayne" Lydia Leavitt, engadget.com, Sep. 14, 2011, 5 pages.* http://web.archive.org/web/20111227063052/http://www.tcelectronic.com/toneprint-app., "TonePrint® App for iPhone® and Android ™", Dec. 27, 2011, 3 pages.

http://web.archive.org/web/20111111161211/http://www.youtube.com/, "What is TonePrint?—TC Electronic's Tore Mogensen explains", Nov. 11, 2011, 2 pages.

http://web.archive.org/web/2011103104440/http://www.tcelectronic.com/toneprint, "TonePrint—A Total Tone Transfusion", Oct. 31, 2011, 3 pages.

http://web.archive.org/web/20111112094848/http://itunes.apple.com/us/app/toneprint, "TonePrint", Nov. 12, 2011, 4 pages.

http://web.archive.org/web/20110117212409/http://www.tcelectronic.com/toneprint, "TonePrint", Jan. 17, 2011, 2 pages.

http://web.archive.org/web/20111110220514/http://www.tcelectronic.com/toneprint-app, "TonePrint® App for iPhone® and Android™", Nov. 10, 2011, 3 pages.

http://web.archive.org/web/20110116215542/http://www.tcelectronic.com/toneprints.asp, "Featured TonePrints", Jan. 16, 2011, 10 pages.

http://web.archive.org/web/20040811053838/http://www.line6.com/modelPacks/faq.html, Aug. 11, 2004, 3 pages.

http://web.archive.org/web/20060424141008/http://www.line6.com/modelPacks/faq.html, "Model Packs Frequently Asked Questions", Apr. 24, 2006, 3 pages.

http://line6.com/modelPacks/, "Features", 3 pages, Apr. 20, 2013.

http://web.archive.org/web/20100612082204/http://line6.com/modlePacks/faq.html, "Model Packs Frequently Asked Questions", Jun. 12, 2010, 2 pages.

Magicstomp, "Using Your Computer to Edit Patches", Sep. 21, 2004, 1 page.

Magicstomp, "Quick Guide", Apr. 20, 2004, 1 page.

Magicstomp, "Patch Lists", Apr. 20, 2004, 1 page.

http://web.archive.org/web/20090304152327/http:/www.magicstomp.com/eng_flash, "New Guitar Effects Pedal Is 'Magic'", Mar. 4, 2009, 1 page.

http://web.archive.org/web/20090304152830/http:/www.magicstomp.com/eng_flash, "Stunning Effects and Powerful Amp Models", Mar. 4, 2009, 1 page.

http://web.archive.org/web/20090304152830/http:/www.magicstomp.com/eng_flash, "99 Factory Presets /99 User Memories", Mar. 4, 2009, 1 page.

http://web.archive.org/web/20090304152830/http:/www.magicstomp.com/eng_flash, "Easy to Use", Mar. 4, 2009, 1 page.

http://web.archive.org/web/20090304152830/http:/www.magicstomp.com/eng_flash, "Upload New Effects via USB", Mar. 4, 2009, 1 page.

http://web.archive.org/web/20090304152830/http:/www.magicstomp.com/eng_flash, "CD-ROM Patch Library", Mar. 4, 2009, 1 page.

http://web.archive.org/web/20090304152830/http:/www.magicstomp.com/eng_flash, "Sound Editor for MAGICSTOMP", Mar. 4, 2009, 1 page.

http://web.archive.org/web/20090304152302/http:/www.magicstomp.com/eng_flash, "Preset Patch Descriprtion & Demo", Mar. 4, 2009, 1 page.

http:web.archive.org/web/20090304152219/http://www.magicstomp.com/eng_Library, "On-Line Patch Library", Mar. 4, 2009, 1 page.

Magicstomp, "Patch List", Dec. 12, 2003, 2 pages.

Magicstomp, "Software for Magicstomp—Installation Guide", 2003, Yamaha Corporation, 11 pages.

Magicstomp, "Owner's Manual", Dec. 12, 2003, 30 pages.

Magicstomp, "Sound Editor for Magicstomp—Owner's Manual", 2003, Yamaha Corporation, 25 pages.

Magicstomp, "Effect List", Dec. 12, 2003, 31 pages.

Non-Final Office Action for corresponding U.S. Appl. No. 13/916,310, mailed Oct. 23, 2013, 6 pages.

Final Office Action for corresponding U.S. Appl. No. 13/916,310, mailed May 21, 2014, 7 pages.

* cited by examiner

PROGRAMMABLE MUSICAL INSTRUMENT PEDALBOARD

CROSS-REFERENCE TO RELATED APPLICATIONS

This application is a continuation of U.S. application Ser. No. 13/916,310 filed Jun. 12, 2013, which, in turn, claims the benefit of U.S. provisional application Ser. No. 61/658,707 filed Jun. 12, 2012, the disclosures of which are hereby incorporated in their entirety by reference herein.

TECHNICAL FIELD

Various embodiments as disclosed herein generally relate to a programmable pedalboard for a musical instrument.

BACKGROUND

Guitarists, including bass players, are known to utilize various effects while playing a guitar or bass. Such effects may include distortion, chorus, compressor, delay, etc. A discrete pedal may be designed to provide a single effect. For example, a guitarist may include any number of discrete pedals that are daisy chained together via a number of electrical cables such that each pedal provides a particular guitar effect. One of such discrete pedals may be configured to provide distortion, while another discrete pedal may provide chorus and so on. The types of effects used may vary based on the genre of music that is performed by the guitarist. Each pedal box is generally rectangular in nature and generally enclosed in a durable housing to withstand some degree of wear and tear. Each pedal box may be selectively turned on/off via a switch by the foot or hand of the guitarist. For example, guitarists may selectively turn on/off a pedal depending on the whether the desired effect is needed for a particular song that is being played. In most cases, the pedal is switched on/off by the guitarist through the use of their feet in order to avoid bending down with the guitar in their hands. This allows the guitarist the ability to play the song uninterrupted while turning on/off a various pedal.

Each pedal box is arranged to have a distinctive personality, such as for example a particular look/color so that they differ from one another to allow the guitarist the ability to distinguish between the same while playing on the stage. As one would expect, guitarists typically play in clubs, bars, etc. where lighting may be an issue. While these discrete effect pedals are commonly used by guitarists, one drawback is that they may be cumbersome for the guitarist to travel with while traveling to various gigs, rehearsals or studio sessions, particularly if the guitarist employs a large number of discrete pedals in his/her gear. In addition, "on the fly" re-configurability of effects chains may be difficult with these hardware based discrete pedals in a particular series/parallel sequence, unless the pedalboard incorporates a professional effects switching control system that is connected to all connected pedals.

Integrated multi-effects units are also available for a guitarist. Such units generally include a fixed number of effects that are integrated into a single unit that includes two or more pedals. These units may be less cumbersome to travel with since each unit incorporates a fixed number of effects within a single housing. The various fixed number of effects included within the integrated pedalboard may be selected via a combination of foot pedal switches and knob/buttons. One drawback of the integrated multi-effects unit is that additional effects cannot be added to the unit. The guitarist is generally stuck with the effects originally provided by the manufacturer. To add a new effect, the guitarist is required to either purchase a new multi-effects unit with additional effects or purchase one or more discrete pedals to daisy chain with the existing multi-effects unit. In addition, the fixed effects in the multi-effects unit may typically have fixed signal chain configurations.

The user interface to such multi-effects units are generally small and cryptic, often utilizing an array of light emitting diodes (LEDs), or other a limited number of alpha-numeric characters to indicate preset names, numbers, parameter types and values. In addition, these multi-effects units may utilize one or more small liquid crystal display (LCD) screens, such as a graphical LCD screen to attempt to provide a visual representation of effects chains. There may be cost a disadvantage in attempting to incorporate larger color LCD screens into a multi-effects unit.

SUMMARY

In one embodiment, a programmable pedalboard for a musical instrument is provided. The pedalboard includes a docking station for receiving a removable portable computer that provides a plurality of instrument effects. The docking station is configured to receive an audio signal from a musical instrument and to modify the audio signal from the musical instrument based on at least one instrument effect from the plurality of instrument effects.

In another embodiment, a programmable pedalboard for a guitar is provided. The pedalboard includes a docking station for receiving a removable portable computer that provides a plurality of guitar effects. The docking station is configured to receive an audio signal from a guitar and to modify the audio signal from the guitar based on at least one guitar effect from the plurality of guitar effects.

In another embodiment, a programmable pedalboard for a musical instrument is provided. The pedalboard includes an interface for providing a plurality of instrument effects that is operably coupled to a docking station. The docking station receives an audio signal from a musical instrument and modifies the audio signal from the musical instrument based on one or more of the plurality of instrument effects. The interface is configured to enable a user to drag and drop any one or more of the plurality of instrument effects in any order thereof.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
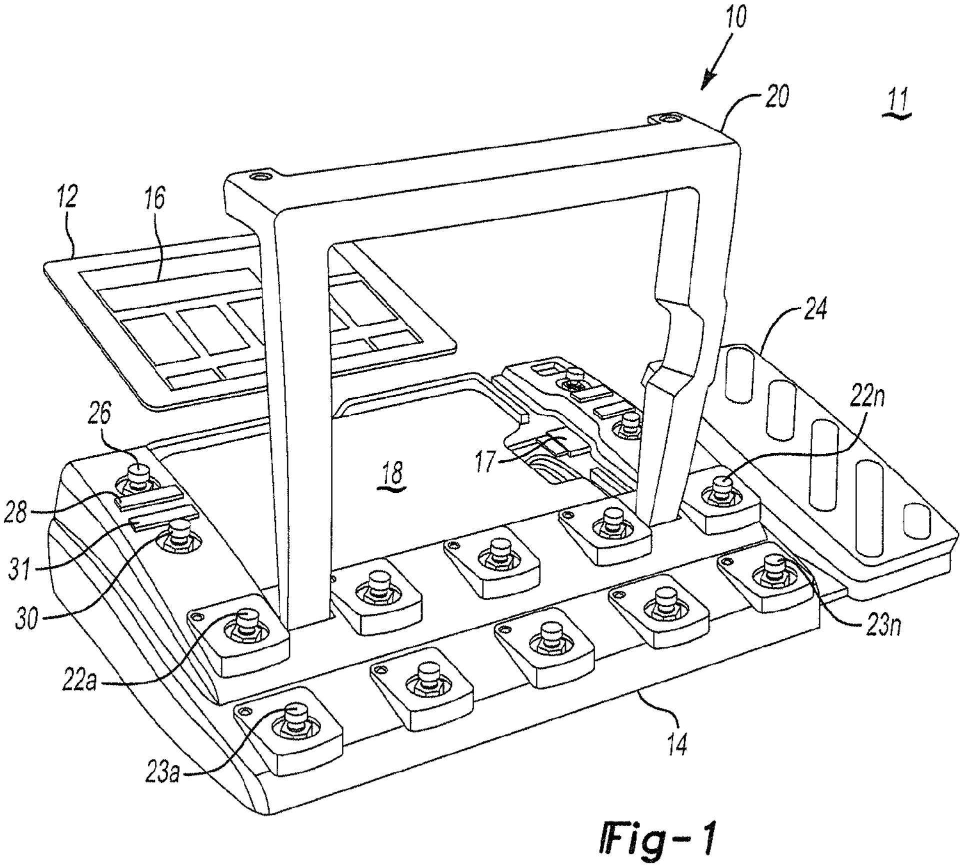
FIG. 1 depicts a programmable guitar pedalboard in accordance to one embodiment.

As required, detailed embodiments are disclosed herein; however, it is to be understood that the disclosed embodiments are merely examples of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments of the present disclosure generally provide a portable computer and a guitar docking station ("docking station") for receiving the same as used in connection with a programmable pedal board. While the embodiments disclosed herein note that the portable computer and or the docking station may be used in connection with a guitar, it is recognized that the portable computer and the docking station may be used in connection with any musical instrument, such as but not limited to, bass guitar, vocals, keyboards, etc. The portable computer may be carried and function independent of the docking station when not coupled to the docking station. In one example, the portable computer may perform any task performed by a desktop or laptop. A user may download an application onto the portable computer from a server to enable the portable computer to communicate bi-directionally with the docking station. A guitarist may select various guitar effects via the portable computer itself or through switches positioned on the docking station. The portable computer is generally configured to provide a visual indication of separate guitar pedals which represent visible and functional characteristics of discrete pedals generally used by guitarists. Such visual indicators may match the discrete pedals in color, size, the number of switches, and control parameters as selected via knobs known to the specific discrete pedals. In addition, the portable computer may also provide amplifier and speaker cabinet representations.

The portable computer enables the guitarist the ability to select from a number of pedals. Such pedals can be added or removed as desired. Further, the application itself can be modified to include new pedal effects that are being introduced into the public for consumption and subsequently downloaded into the portable computer for use with the docking station. For example, software code (e.g., digital signal processor (DSP) and operating system (OS) components) is downloaded into the docking station and software code (e.g., user interface (UI) and OS components) is downloaded into the portable computer. The portable computer may also enable the guitarist the ability to select various control parameters via the knobs or switches of the discrete pedals as provided on a display of the portable computer to enable the guitarist to simulate use of an actual pedal box. The portable computer may enable the guitarist the ability to select from any number of amp and speaker configurations. The docking station may also engage in bi-directional communication with the portable computer such that functionality presented on a display of the portable computer can be controlled via switches positioned on the docking station, or vice versa. In addition, various bank presets as displayed on the portable computer may be transmitted therefrom and to the docking station to notify the guitarist of the selected bank preset. These features and other aspects will be set forth in more detail herein.

As noted above, there may be a cost disadvantage in attempting to incorporate larger color LCD screens into conventional multi-effects units. However, by adding a portable computer that is multi-functional to the docking station, cost attributed with larger color LCD screens or displays in general may be mitigated. For example, a display associated with the portable computer may be configured to serve as a user interface (and also provide visual indication) for purposes of playing guitar. Further, the display and the portable computer may be used in connection with home/office consumption for non-guitar applications. In short, the cost attributed to the display and the portable computer is already accounted for due to the use of the portable computer for home/office consumption. As such, the portable computer becomes dual purpose and the guitarist is less bothered by the cost of the display for the multi-effects device because it was already paid for. Another advantage of using a portable computer as a display is that cost attributed to various communications and networking hardware are negligible. In addition, the docking station, as disclosed herein, is able to realize through its connection with the portable computer various advantages such as access to various apps, internet capability, online store infrastructure, firmware updatability over a network, etc.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

FIG. 1 depicts a programmable pedalboard ("pedalboard") 10 in accordance to one embodiment. The pedalboard 10 receives an input from a musical instrument 11 (e.g., an electric guitar, bass, etc.) via a cable (e.g., guitar cable (not shown)) and the pedalboard 10 further transmits an audio guitar signal to an amplifier ("amp") to amplify the audio signal. In general, the pedalboard 10 is configured to provide any number of audio guitar effects (or other musical instrument effects if used for another type of musical instrument) to the input received from the guitar (or other instrument) to provide a variety of sounds for use by a musician. Such sounds may be specific to particular genres of music played by the musician.

The pedalboard 10 generally comprises a portable computer 12 and a docking station 14. In one example, the portable computer 12 may be implemented as any tablet, such as for example, and Apple® iPad® or other suitable device. The portable computer 12 includes a display 16 for presenting guitar effects, amplifiers, and speaker cabinets to a guitarist. In addition, the display 16 of the computer 12 may also function as a touch screen (e.g., switching device) to enable the guitarist to select desired effects thereon. These features will be discussed in more detail below. The docking station 14 further includes a connector 17 for electrically coupling electrical devices (not shown) therein to the portable computer 12 to enable bi-directional communication between the docking station 14 and the portable computer 12.

The docking station 14 includes any number of portable computer trays 18 for receiving an underside of the portable computer 12. It is contemplated that the tray 18 may be interchangeable with other trays to receive a particular profile of the underside of the portable computer 12. In one example, screws or other suitable fastening mechanism (not shown) may be used to attach the tray 18 to the docking station 14. In the event a different tray 18 is needed to receive a portable computer 12 that may have a different underside profile, a user may remove the fastening mechanism and the currently installed tray 18 and replace with another tray 18 that is formed to receive the different underside of portable computer 12 with the fastening mechanism.

Figure 2:
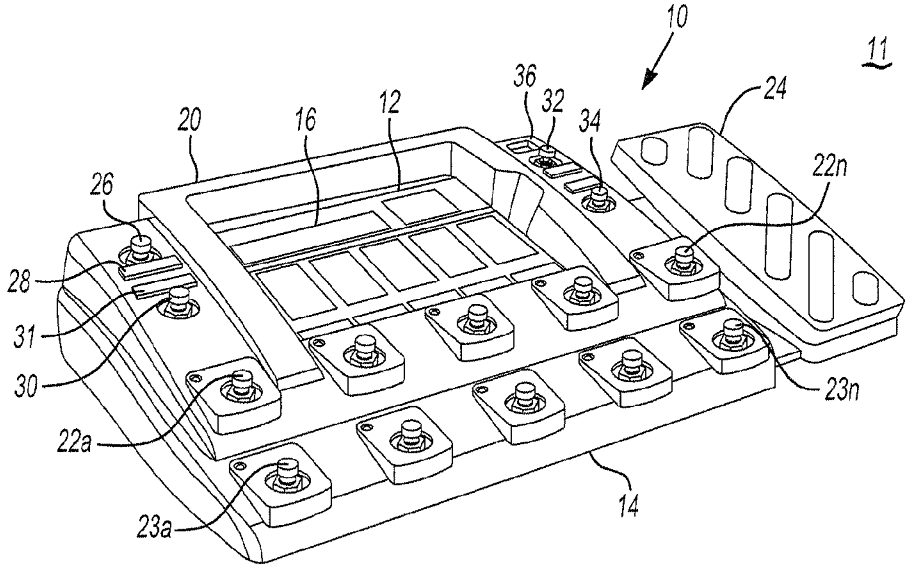
FIG. 2 depicts another view of the programmable guitar pedalboard in accordance to one embodiment.

The docking station 14 further includes a door 20 that is pivotally coupled thereto to secure the portable computer 12 to the docking station 14. To secure the portable computer 12 to the docking station 14, the door 20 is moved downward and applies a force against portable computer 12. FIG. 2 depicts the manner in which the door 20 is moved to a fully downward position to secure the portable computer 12 to the docking station 14. The manner in which the door 20 secures the portable computer 12 to the docking station 14 will be discussed in more detail in connection with FIGS. 5A-5F.

Referring generally to FIGS. 1-2, the docking station 14 further includes a first plurality of switches 22*a*-22*n* ("22") (also labeled A, B, C, D, E, etc.). The first plurality of switches 22 may be used by the guitarist to select different pedal effects (or pedals). Such pedal effects may also be selected through the display 16 of the portable computer 12 or through the first plurality of switches 22 on the docking station 14. A second of plurality of switches 23*a*-23*n* ("23") may be used by the guitarist to select various tones (or guitar tones) (e.g., meaning reconfigured pedalboards) which correspond to a particular bank of effects. Such tones may also be selected via touch screen selection on the display 16 of the portable computer 12. The pedalboard 10 is generally positioned on the floor or other flat surface to enable the guitarist to select the switches 22 and/or 23 through his/her feet so that the guitarist can continue to play a song uninterrupted. The docking station 14 further includes a foot switch (or expression pedal) 24 that is configured to control volume, Wah effect, or other assigned "continuously variable" effect/parameter.

The docking station 14 further includes a first switch 26 that enables and disables a mono stompbox effects loop. A first light emitting device (LED) 28 or other suitable device is turned on when the stomp loop is active. The docking station 14 further includes a second switch 30 that enables an amp loop. A second LED 31 or other suitable device is turned on when the amp loop is enabled.

The docking station 14 further includes a third switch 32 (see FIG. 2) and a fourth switch 34. The third switch 32 acts to move up from a current selected bank of effects into another selected bank of effects. The fourth switch 34 (see FIG. 2) acts to move down from a current selected bank of effects into another selected bank of effects. The third switch 32, the fourth switch 34, and the bank of effects will be discussed in more detail in connection with FIG. 3. A visual indicator 36 is provided on the docking station 14 to provide a number that corresponds to the current selected bank to the guitarist. The docking station 14 may also be used to enable play even if the portable computer 12 is not connected thereto. For example, the visual indicator 36 may be used to identify which bank is currently selected even if the portable computer 12 is not connected to the docketing station 14.

Figure 3:
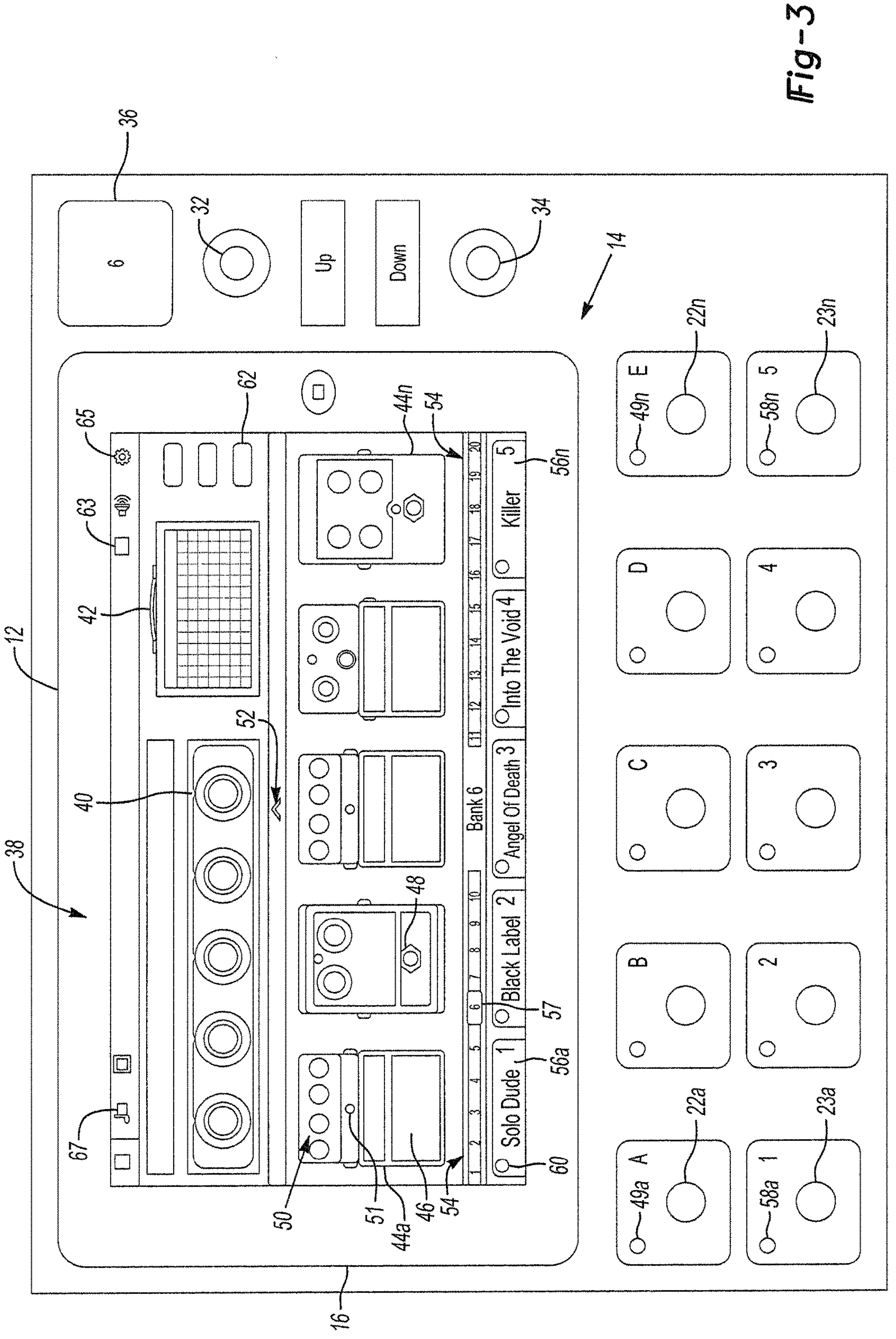
FIG. 3 depicts a more detailed diagram of a portable computer and various switches.

FIG. 3 depicts a more detailed diagram of the portable computer 12 and various aspects of the docking station 14. In general, the portable computer 12 may be configured to execute an application that includes a user interface 38 as shown. A guitarist may download the application onto the portable computer 12. Once the application is download onto the portable computer 12, the guitarist may electrically couple (e.g., either through the connector 17 or via wireless connection) the portable computer 12 to the docking station 14 such that various aspects as shown in the user interface 38 can be selected via the switches (e.g., 22, 23, 32, 34) of the docking station 14. It is recognized that the portable computer 12 does not need to be docked (or inserted) into the docking station 14 to utilize the features of the pedalboard 10.

As shown, the user interface 38 generally includes an amp selection field 40 and an amp cabinet selection field 42. The amp selection field 40 can be selected by the guitarist via user interface 38 (e.g., touch selection) of the portable computer 12 to select a particular amp for simulating a particular sound typically provided by such an amp. For example, the guitarist may select various amps such as Marshall®, Mesa Boogie®, Fender®, Vox®, etc. In one example, the guitarist may select from up to 54 amps. The guitarist may also select the various knobs via touch screen capability as shown in the amp selection field 40 to control the gain, bass, middle, treble, etc. for a given selected amp.

The amp cabinet selection field 42 can be selected by the guitarist via the user interface 38 (e.g., touch selection) of the portable computer 12 to select a particular cabinet for simulating a particular sound typically provided by a speaker used in such a cabinet. For example, the guitarist may select various cabinets such as DigiTech Bright®, JBL®, Vox®, etc. In one example, the guitarist may select from up to 26 cabinets.

The user interface 38 also provides a visual indication of various pedal effects 44*a*-44*n* ("44"), each being represented with visible and functional characteristic of discrete pedals as used by guitarists. The pedals 44 generally provide a similar effect to its hardware based discrete pedal equivalent. For various representations of the pedals 44, there may not be a hardware-based equivalent pedal. The appearance of the pedal effects 44 as shown in the user interface 38 may match the appearance of it corresponding hardware based discrete pedal in name (i.e., Distortion, Overdrive, Flanger, Chorus, etc.), color, number of switches, and control parameters as selected via the knob known to the specific discrete pedals. The guitarist may activate a particular effect 44 via the user interface 38 by simply touching a black padded portion 46 or switch 48 (or pedal select circuit 48). Also, the guitarist may simply select any one of the switches 22 to activate or deactivate a particular pedal 44. As shown in FIG. 3, switch 22*a* enables the pedal 44*a* to be activated or deactivated, switch 22*b* enables the pedal 44*b* to be activated or deactivate, and so on down the row. The docking station 14 further includes a plurality of visual indicators 49*a*-49*n* ("49"), each being positioned proximate to the switch 22 for indicating whether a particular pedal 44 is active or not. In the event the guitarist selects the black padded portion 46 or switch 48 as shown in the user interface 38, or alternatively selects the switch 22 to activate a given pedal 44, the visual indicator 49 for that pedal 44 may be turned on to indicate that the pedal 44 is active. In addition, a visual indicator 51 as located directly on the pedal 44 may be turned on to indicate that a particular pedal 44 is active (this is representative of the manner in which a hardware based discrete pedal 44 may also indicate to the guitarist that it is active). All of the pedals 44 may be active or disabled at one time. In addition, any combination of the pedals 44 may be activated or disabled.

If the guitarist uses the user interface 38 to activate a particular pedal 44, then the portable computer 12 transmits data indicative of which pedal 44 is active to the docking station 14 so that the corresponding visual indicator 49 thereon can be activated. Likewise, if the guitarist uses the switches 22 to activate a particular pedal 44, then the docking station 14 transmits data indicative of which pedal 44 is activated to the portable computer 12 such that the pedal 44 is activated and to turn on the visual indicator 51 for that corresponding pedal 44. The portable computer 12 is also configured to zoom in on a particular pedal 44 to enable the guitarist to easily select an input parameter via the knobs 50 or to simply activate or deactivate the pedal 44. For example, the guitarist may simply double tap the pedal 44 as shown in the user interface 38 to zoom into the pedal 44.

The user interface 38 may also enable the guitarist the ability to select various control parameters via the knobs or switches 50 of the discrete pedals (or effects) 44 as provided on a display 16 via touch selection of such knobs or switches 50 to enable the guitarist to simulate use of an actual pedal box. While only five pedal effects 44 are shown in the user interface 38, it is contemplated that any number of additional pedal effects 44 may be added. In one example, an expansion bar 52 is provided in the user interface 38 to enable the guitarist to control additional pedal effects 44 that may be present for a particular bank.

The user interface 38 also includes a plurality of banks 54. The guitarist may select a corresponding bank via touch selection on the display 16 (by touching the bank 54 directly) or through the docking station 14 via the switches 32, 34. Each bank 54 generally comprises five custom tones 56. As shown in FIG. 3, bank 6 (see 57 for bank number) includes the following tones 56: "Solo Dude," "Black Label," "Angel of Death," "Into the Void," and "Killer." The user interface 38 depicts that there are twenty banks that are generally offered. However, it is contemplated that the portable computer 12 and the docking station 14 may be configured to provide any number of banks 54. The portable computer 12 selects the pedal 44 for display in the user interface 38 based on the particular tone 56 that is selected by the guitarist. However, any pedal 44 may be selected or used by the guitarist for a given tone 56. The guitarist may simply double tap the pedal 44 to replace it with another pedal 44. For example, the guitarist may elect to replace pedal 44 corresponding to a "Screamer Tube Overdrive" and replace it with pedal 44 corresponding to an "DOD® Overdrive/250."

As exhibited above, the portable computer 12 and the docking station 14 each transmit information corresponding to the selected bank 54 and tone 56 to one another. For example, in the event the guitarist selects "bank 6" via the user interface 38, such data is transmitted to the docking station 14 so that the visual indicator 36 as positioned thereon displays the selected bank (i.e., "6"). Likewise, in the event the guitarist selects "bank 6" via the switches 32 and 34, the docking station 14 transmits information corresponding to the selected bank to the portable computer 12 so that the portable computer 12 selects "bank 6" and so that "bank 6" (e.g., the bank indicator 57) is visually presented in the user interface 38.

The user interface 38 also enables the guitarist to select a particular tone 56 via touch selection. In addition, the guitarist has the option of selecting the particular tone via the switch 23. For example, in the event guitarist elects to activate tone "Solo Dude" via the user interface 38, the guitarist may simply touch such a tone 56. The portable computer 12 then transmits data indicative of the selected tone to the docking station 14. The docking station 14 includes a plurality of visual indicators 58*a*-58*n* ("58"). The visual indicator 58*a* positioned proximate to the switch 23*a* may be activated in response to the guitarist selecting the tone "Solo Dude" via the user interface 38 (e.g., see numeral; "1" on switch 23*a*, this corresponds to numeral "1" as illustrated on tone "Solo Dude"). Accordingly, the switches 23 are numbered to correspond with the numbered tones 56 in the user interface 38.

In the event the guitarist elects to select the corresponding tone 56 via the switch 23, then the docking station 14 transmits data indicative of the selected tone to the portable computer 12 such that the portable computer 12 activates the selected tone 56. Further, a visual indicator 60 (or tone indicator) positioned proximate to the tone label or title on the user interface 38 may then be activated as well.

It is contemplated that the portable computer 12 may enable the guitarist to assign a pedal 44 to a corresponding switch 22 in a customized fashion. For example as described above, the pedals 44 assigned to the various switches 22 may be preset based on the bank 54 and particular tone 56 that is selected. However, the portable computer 12 may allow the guitarist to customize the assignment of a particular pedal 44 to particular switch 22. This may be accomplished by selecting an edit field 62. In this arrangement, the guitarist may simply select the desired pedal 44 and place in an Edit screen (e.g., drop and drag of pedal(s) 44). At that point, the corresponding switch 22 that is desired to be assigned to the selected pedal 44 may be selected to assign the pedal 44 to the corresponding switch 22. Programming capabilities and other aspects related to the programmable guitar pedalboard are disclosed, inter alia, in "iPB-10 Programmable Pedalboard Owner's Manual," 2011, ("Owner's Manual") which is hereby incorporated by reference in its entirety.

A tuner field 63 in the user interface 38 may be selected on the user interface 38 to allow the guitarist the ability to tune his/her guitar. When the tuner field 63 is selected, the docking station 14 recognizes the particular string of the guitar that is picked (or played) and provides a visual indicator per the string that was picked by the guitarist as whether such a string is flat, sharp or in tune. A setting field 65 in the user interface 38 may be selected which provides a setting for the tuner feature. For example, the guitarist can select the manner in which the strings can be tuned to. Specifically, the guitarist may desire to tune the guitar to 440 Hz or any suitable frequency thereof. The setting field 65 may also enable the guitarist to calibrate the sensitivity of the expression pedal 24. Further, the expression pedal 24 can be calibrated to behave like an analog volume pedal. Additional features that may be selectable via the setting field 65 may include, but not limited to, a screen saver disable, USB level and USB Mix, Factory Reset, Global Amp/Cabinet Bypass (e.g., remove or turn off the amp and cabinet modeling in all bank or tone presets). These features may be described in more detail in connection with the Owner's Manual as noted above. A "My Tones" field is selectable via the user interface 38 to access a main preset library where all presets (e.g., banks 54 and tone 56) used by the pedalboard 10. From the My Tones screen, the guitarist can copy up to 100 presets to an internal memory (not shown) in the docking station 14 such that the docking station 14 can be used even if the portable computer 12 is not electrically connected thereto.

The programmable computer 12 may also have the capability of storing and scrolling lyrics for various songs and corresponding tablature notation (or sheet music) for display to the guitarist so that the guitarist can sing the lyrics or play his/her instrument according to the tablature.

Figure 4:
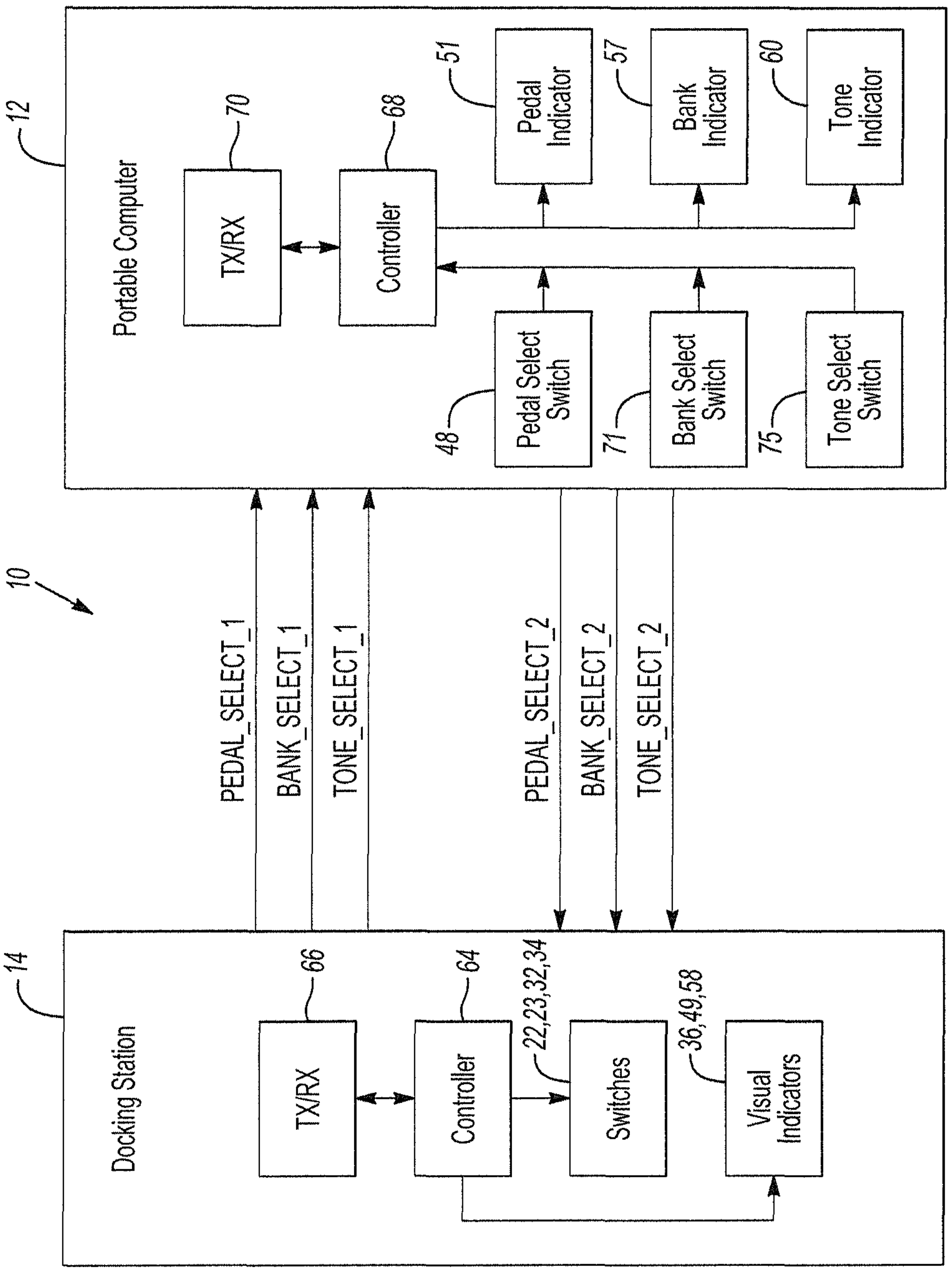
FIG. 4 depicts a block diagram of the docking station and the portable computer for transmitting data therebetween.

FIG. 4 depicts a block diagram of the portable computer 12 and docking station 14 for transmitting data therebetween. As noted above, the pedalboard 10 allows the use of, but not limited to, (1) activating/deactivating the pedal 44, (2) selecting a corresponding bank 54, and (3) selecting a particular tone 56. Accordingly, one or more the various switches 22, 23, 32, 34 positioned on the docking station 14 are used in connection with activating/deactivating the pedal 44, selecting a corresponding bank 54, and selecting a particular tone.

The docking station 14 includes a controller 64, the switches 22, 23, 32, 34 and the visual indicators 36, 49, 58. The controller 64 monitors the state of the switches 22, 23, 32, and 34 and transmits the same to the portable computer 12. For example, the controller 64 monitors whether a particular pedal 44 is activated or deactivated via the switch 22. The controller 64 transmits a signal PEDAL_SELECT_$_1$ to the portable computer 12, which indicates whether a particular pedal 44 is activated or deactivated. In addition, the controller 64 monitors whether a particular bank 54 has been selected via the switches 32 and 34 (see FIG. 3 and up/down switches 32 and 34). The controller 64 transmits a signal BANK_SELECT_$_1$ to the portable computer 12, which indicates which bank 54 has been selected. The controller 64 also monitors which tone 56 has been selected via the switch 23. The controller 64 transmits a signal TONE_SELECT_$_1$ to the portable computer 12, which indicates which tone 56 has been selected. It is recognized that the signals PEDAL_SELECT_$_1$, BANK_SELECT_$_1$, and TONE_SELECT_$_1$ may be transmitted by the docking station 14 via a hardwired connection via the connector (see FIG. 1) or may be wirelessly transmitted via a transmitter 66 to the portable computer 12. The docking station 14 also includes a receiver 66 for wirelessly receiving data.

The portable computer 12 includes a controller 68 that receives the signals PEDAL_SELECT_$_1$, BANK_SELECT_$_1$, and TONE_SELECT_$_1$. The portable computer 12 may then activate/deactivate the pedal indicator 51 (see FIG. 3) based on the data included on the signal PEDAL_SELECT_$_1$. In addition, the portable computer 12 may then provide an indication as to which bank 54 via the bank indicator 57 (see FIG. 3) has been selected based on data included on the signal BANK_SELECT_$_1$. The portable computer 12 may then also provide an indication as to which tone 56 via the tone indicator 60 (see FIG. 3) has been selected based on the data include on the signal BANK_SELECT_$_1$.

The controller 68 monitors which pedal 44 has been activated/deactivated, which bank 54 has been selected, and which tone has been selected on the user interface 38. As noted above in connection with FIG. 3, each pedal 44 as shown in the user interface 38 can be activated or deactivated via a black padded portion 46 or knob 48. The black padded portion 46 or knob 48 may be generally defined collectively as a pedal select switch 48 and is illustrated in FIG. 4 as the same. As further noted above, the user interface 38 enables touch selection of the bank 54 and tone 56. The touch selection of the bank 54 and the tone 56 are generally defined as the bank select switch 71 and tone select switch 75, respectively, and are each illustrated in FIG. 4. Each of the pedal select switch 48, the bank select circuit 71, and the tone select circuit 75 may be implemented via any combination of hardware and software.

The controller 68 is operably coupled to the switches 48, 71, and 75 and monitors the state thereof. For example, the controller 68 monitors whether a particular pedal 44 is activated or deactivated via the switch 48. The controller 68 transmits a signal PEDAL_SELECT_$_2$ to the docking station 14, which indicates whether a particular pedal 44 is activated or deactivated via the switch 48. In addition, the controller 68 monitors whether a particular bank 54 has been selected via the switch 71. The controller 68 transmits a signal BANK_SELECT_$_2$ to the docking station 14, which indicates which bank 54 has been selected. The controller 68 also monitors which tone 56 has been selected via the switch 75. The controller 68 transmits a signal TONE_SELECT_$_2$ to the docking station 14, which indicates which tone 56 has been selected. It is recognized that the signals PEDAL_SELECT_$_2$, BANK_SELECT_$_2$, and TONE_SELECT_$_2$ may also be transmitted through a hardwired connection via the connector 17 (see FIG. 1) or may be wirelessly transmitted to the docking station 14 via a transmitter 70. The portable computer 12 also includes a receiver 70 for wireless receiving the signals PEDAL_SELECT_$_1$, BANK_SELECT_$_1$, and TONE_SELECT_$_1$. Conversely, the receiver 66 of the docking station 14 may also wirelessly receive the signals PEDAL_SELECT_$_2$, BANK_SELECT_$_2$, and TONE_SELECT_$_2$.

The docking station 14 may then activate/deactivate the pedal indicator 36 (see FIGS. 2 and 3) based on the signal PEDAL_SELECT_$_2$. In addition, the docking station 14 may then provide an indication as to which bank 54 via the bank indicator 36 has been selected based on the signal BANK_SELECT_$_2$. The docking station 14 may then also provide an indication as to which tone 56 via the tone indicator 58 has been selected based on the signal BANK_SELECT_$_2$. It is recognized that the bi-directional information exchange as illustrated in FIG. 4 is not intended to a complete listing of data that is transmitted between the portable computer 12 and the docking station 14.

FIGS. 5A-5F depict various views of one end of the door 20 in various states in accordance to one embodiment. In reference to FIG. 5A, the door 20 is shown in a fully open position to enable the guitarist to insert the portable computer 12 into the tray 18 and to allow the electrical connection between the portable computer 12 and the docking station 14 to be made with the connector 17 (see also FIG. 5B for additional reference). The door 20 includes at least one receiving hole 72 and a damping gasket 73 positioned on an underside thereof for contacting the display 16 of the portable computer 12. The damping gasket 73 extends over the entire portion of the door 20 that is arranged to contact the display 16 when the door 20 is in the fully closed position to secure the portable computer 12 to the docking station.

Figure 5A:
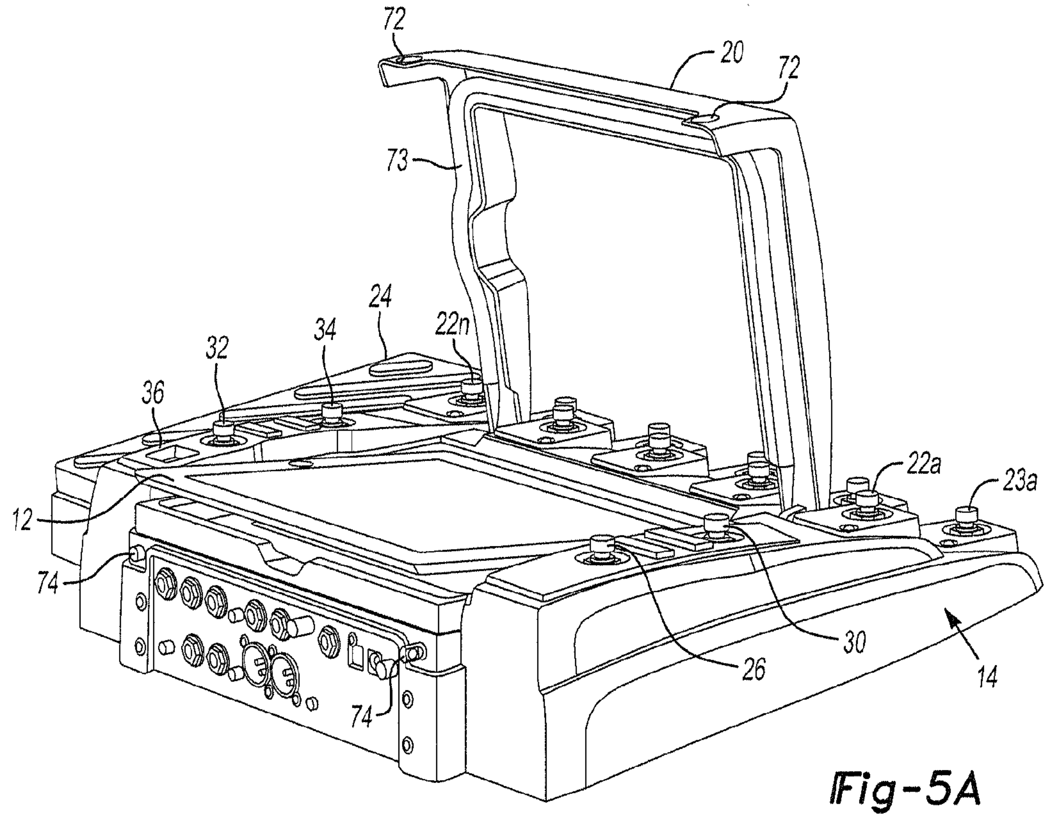
FIGS. 5A-5F depict various views of one end of a door in various states in accordance to one embodiment.
Figure 5B:
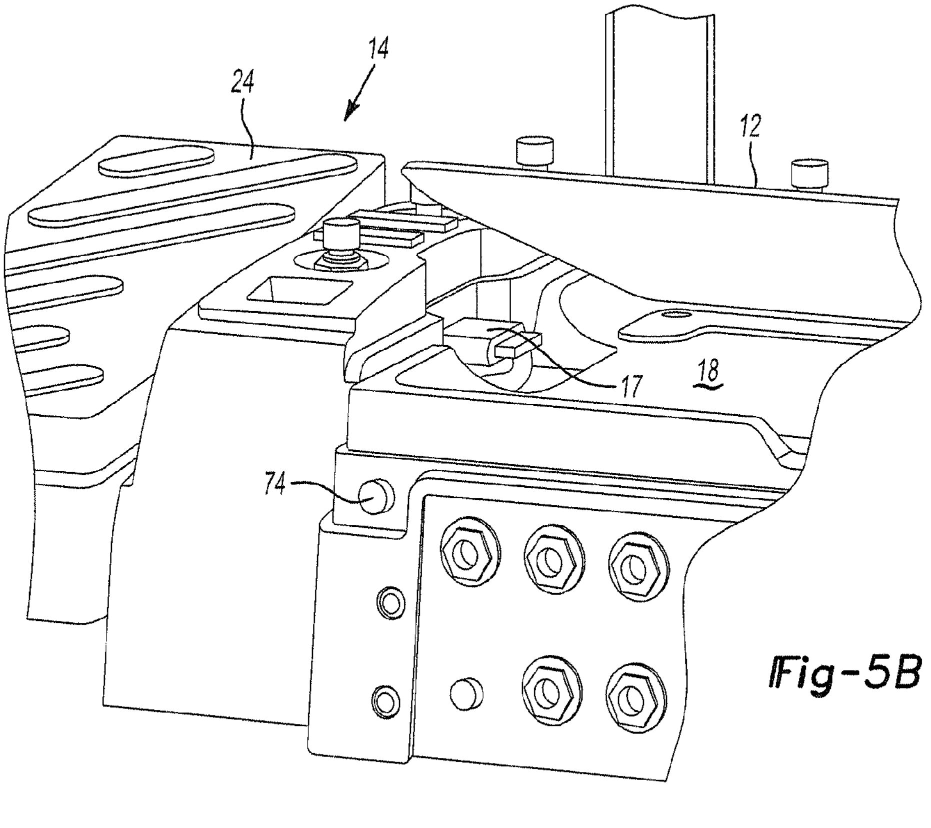
Figure 5C:
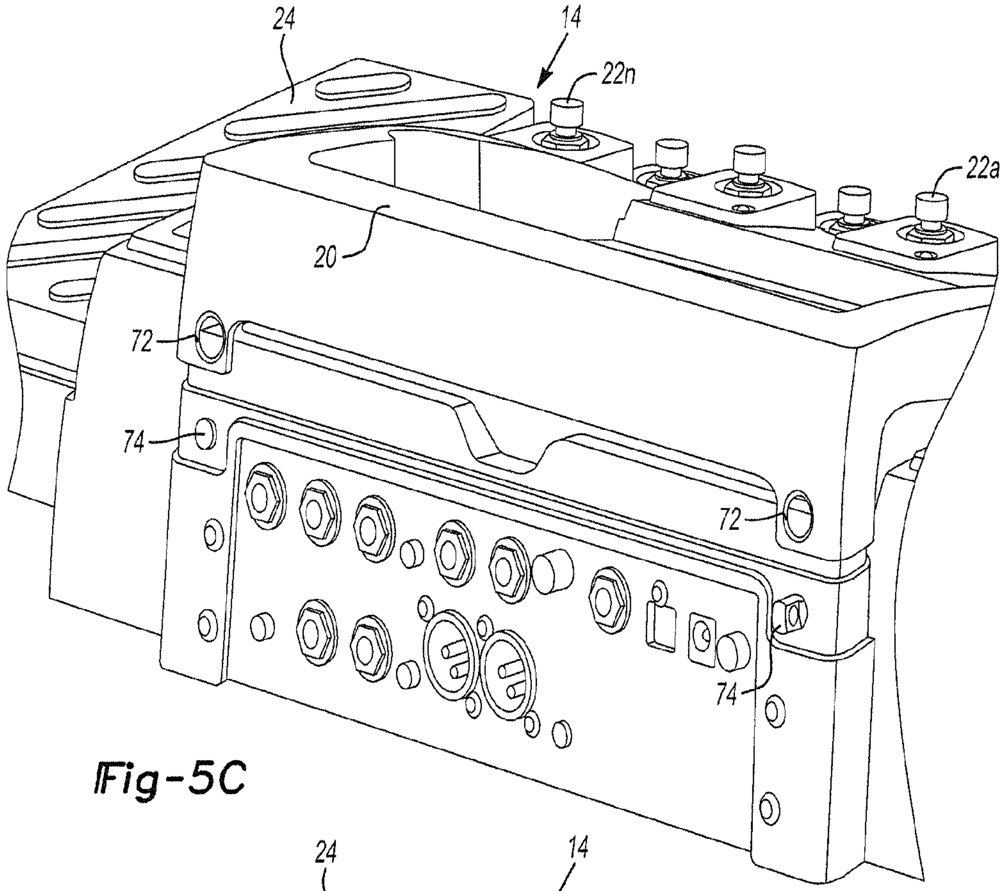

At least one retractable male pin 74 is positioned on a rear side of the docking station 14. FIG. 5C depicts the door 20 translating (or pivoting) from the fully open position to semi-closed position. As shown, the receiving hole 72 is aligned to receive the retractable pin 74 in order to secure the portable computer 12 to the docking station 14.

Figure 5D:
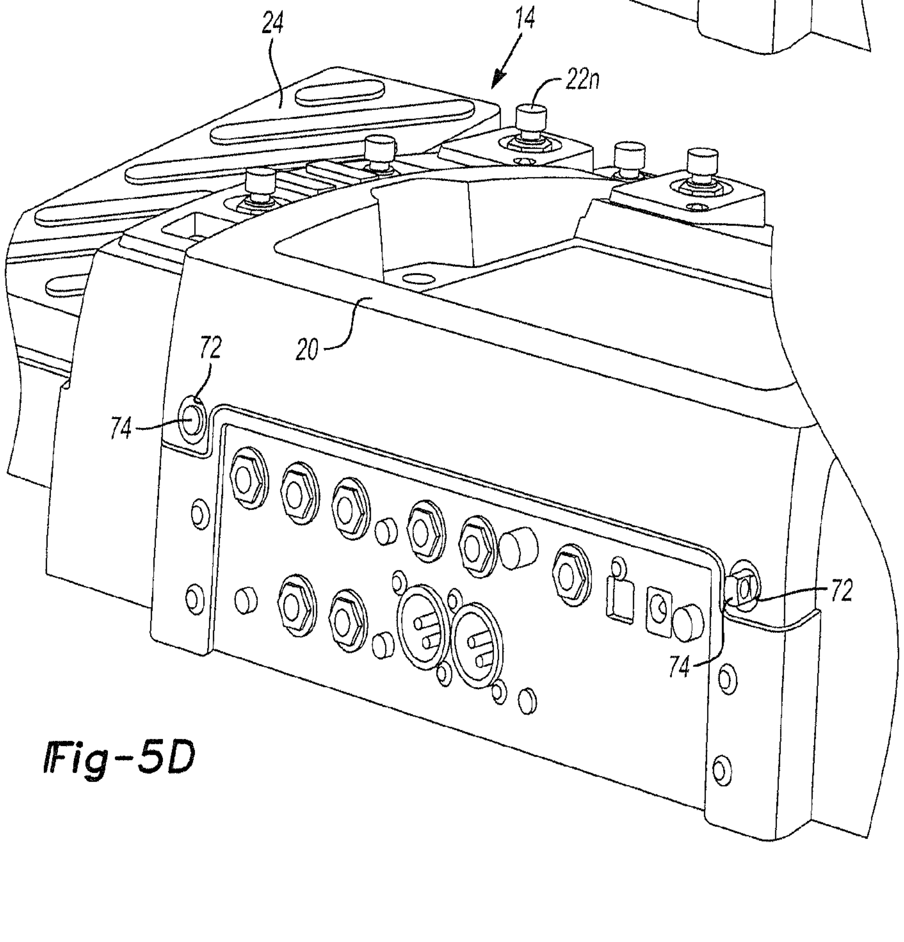

FIG. 5D depicts the door 20 being in a fully closed position. As shown, the receiving hole 72 has received the retractable male pin 74 such that the pin 74 protrudes outwardly from the hole 72. Prior to the door 20 reaching its fully closed position, a portion of the door 20 positioned below the receiving hole 72 contacts the retractable pin 74 causing the same to retract inward into the docking station 14 such that the door 20 continues to move downward toward the fully closed position. As the receiving hole 72 passes over the pin 74, the pin 74 retracts outwardly away from the docking station 14 and into the receiving hole 72 to secure the portable computer 12.

Figure 5E:
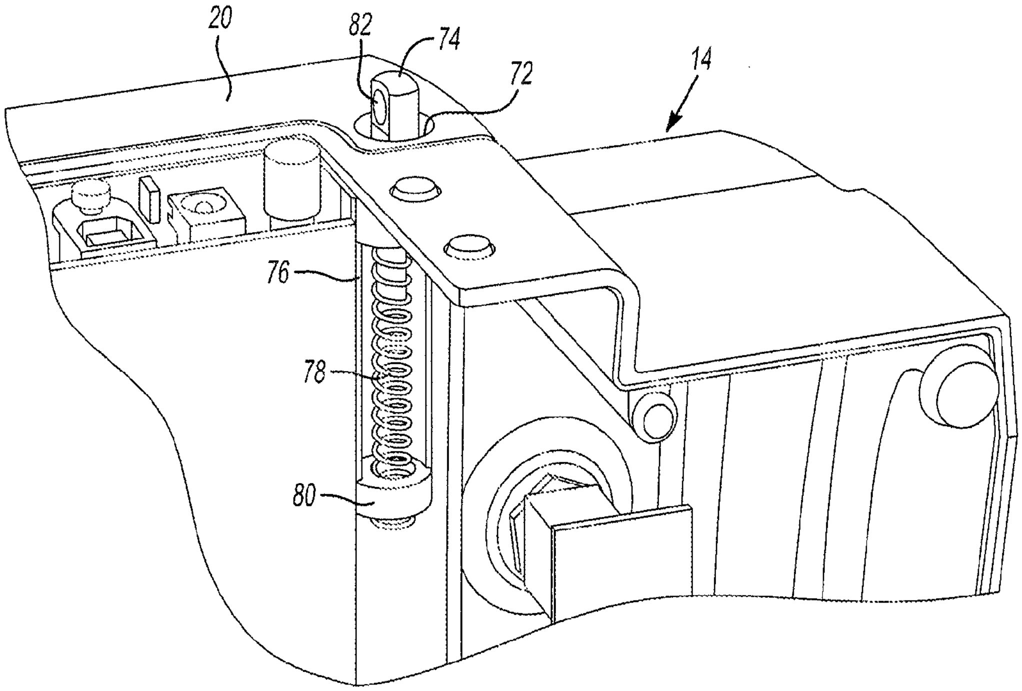
Figure 5F:
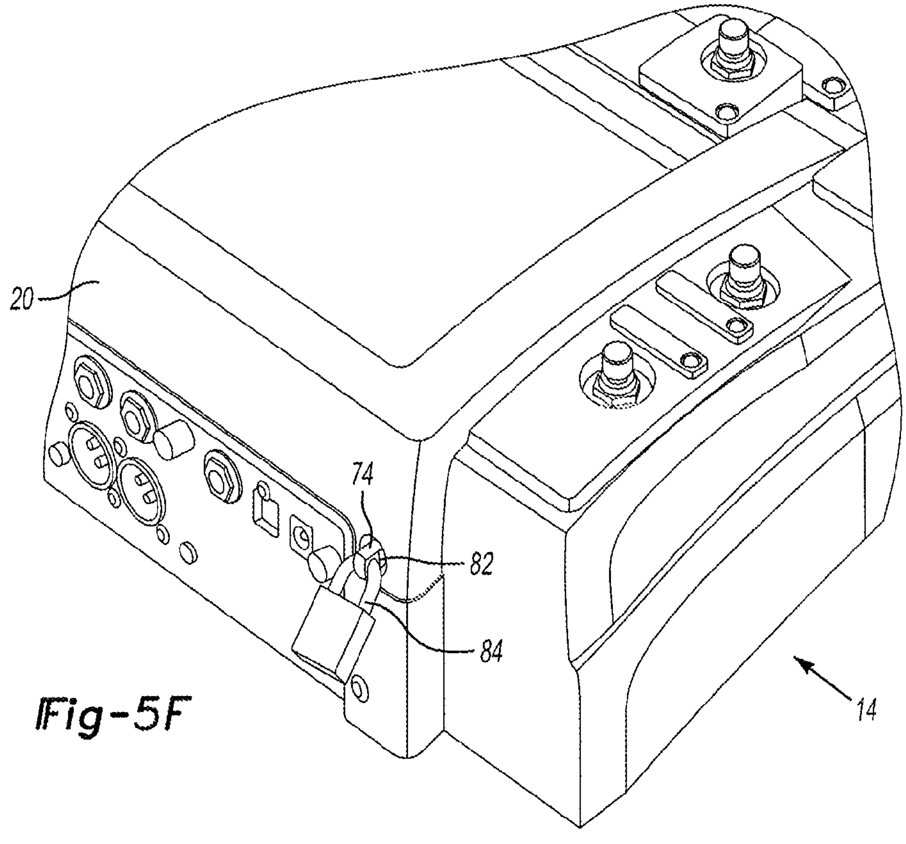
Figure 6A:
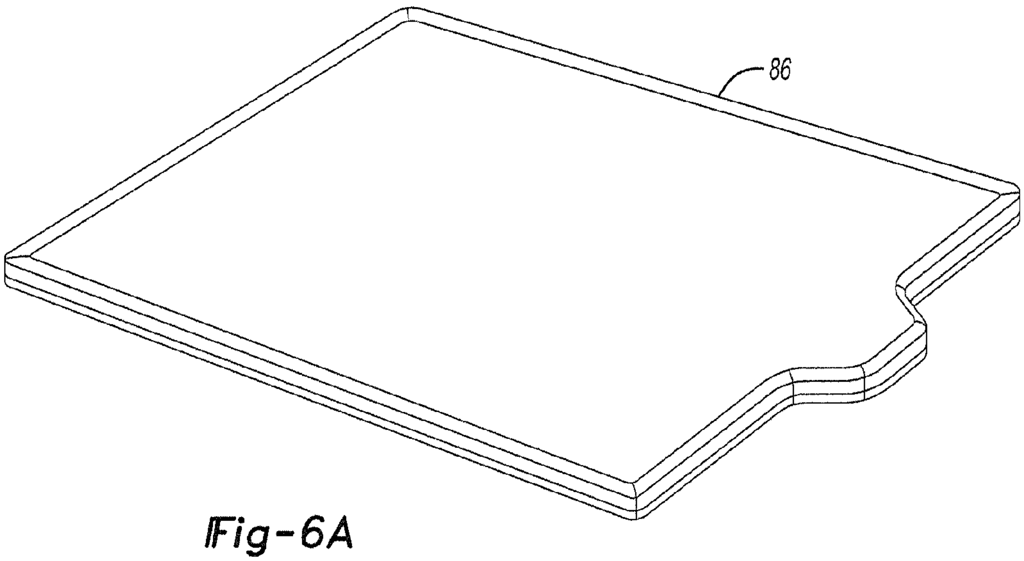
FIGS. 6A-6D depict various views of a protective visor to cover a display of the portable computer.
Figure 6B:
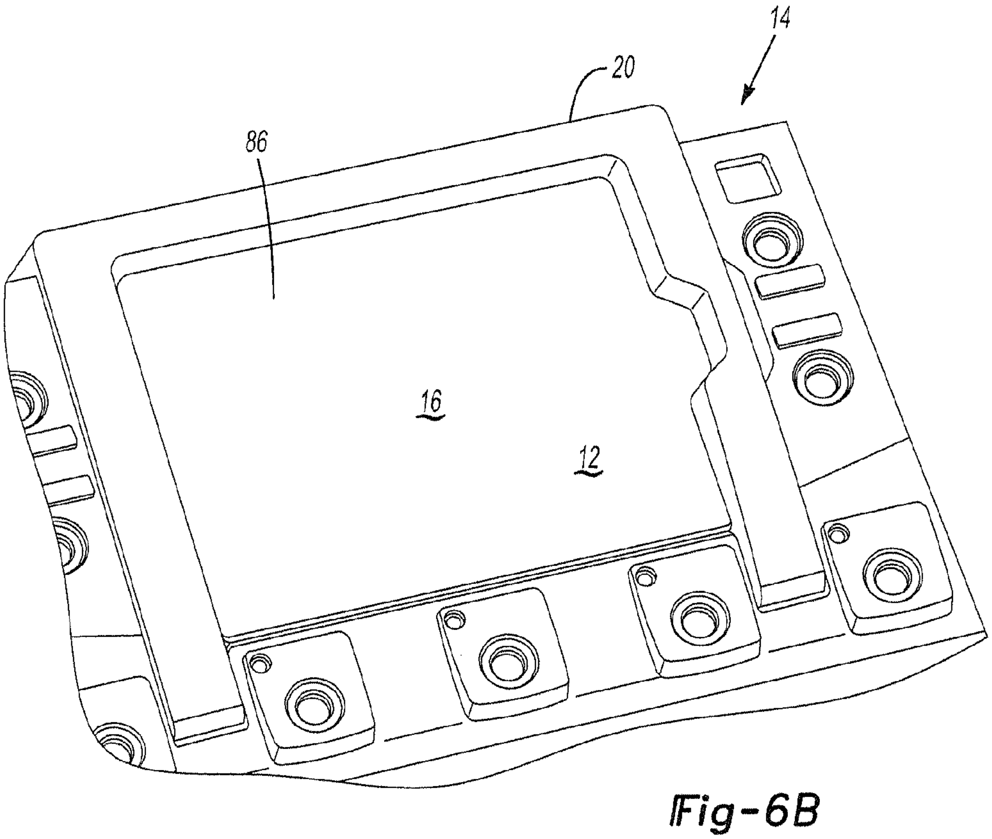
Figure 6C:
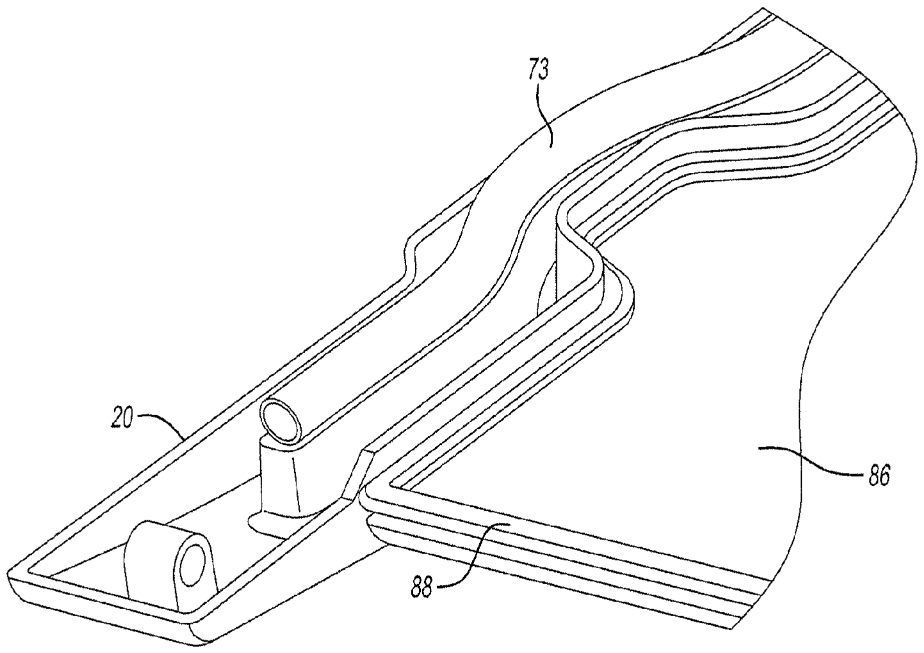
Figure 6D:
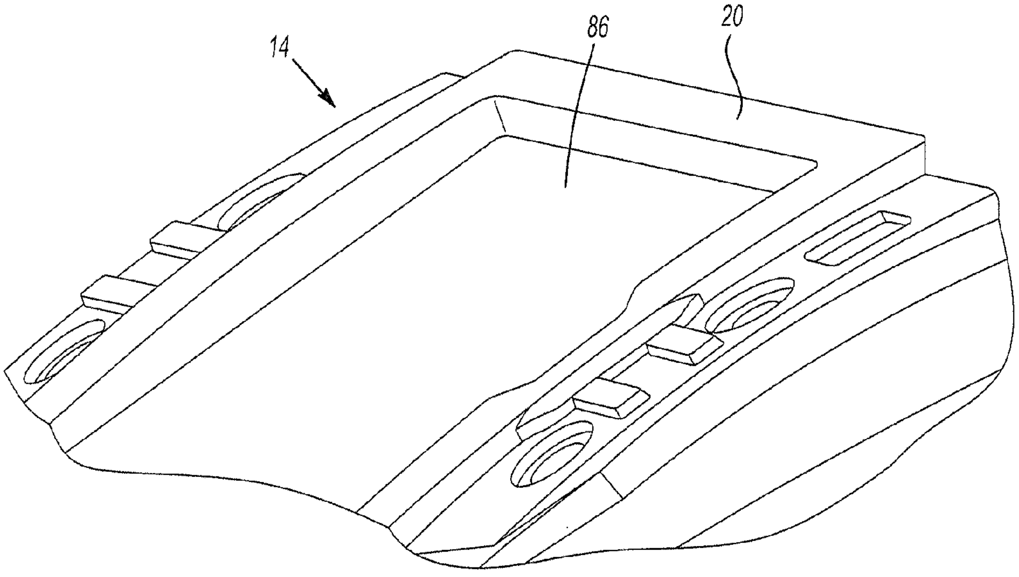

FIG. 5E depicts the manner in which the retractable pin 74 is configured to retract inwardly and outwardly. For example, the docking station 14 defines a channel 76 for housing a spring 78. One end of the pin 74 is fixed to one end of the spring 78. A backstop 80 is provided in the docking station 14 and is coupled to the other end of the spring 78. As shown, the pin 74 is spring loaded into the channel 76. As the door contacts the pin 74, the spring 78 compresses in response to the contact. Once the receiving hole 72 is aligned over the pin 74, the spring releases causing the pin 74 to insert itself into the receiving hole 72. The pin 74 defines a cavity 82 that protrudes outside of the docking station 14. As shown in FIG. 5F, the cavity 82 is configured to receive a lock 84 to prevent unauthorized access to the portable computer 12 positioned within the docking station 14.

FIGS. 6A-6D depict various view of a visor 86 to cover the display 16 of the portable computer 12. The visor 86 may serve as a protective barrier to the display 16 of the portable computer 12. The visor 86 may still enable touch selection via the user interface 38. In one example, a portion of the perimeter of the visor 86 may be arranged to interlock with a partial inner portion of the door 20 to secure the visor 86 to the door 20 (see FIGS. 6B and 6D). The visor 86 may include a protective gasket 88 positioned on an inner portion thereof for contacting the portable computer 12 (see FIG. 6C).

In general the portable computer 12 and/or the docking station include any combination of hardware and software for performing a number of features. Such features will be described in more detail hereafter. The portable computer 12 may be arranged to enable WiFi, cell network, Bluetooth®, or wired internet access. Such internet access enables on-going app updates to be downloaded to the portable computer 12 and to the docking station 14. In addition, the guitarist may be able to download e-pedals onto the portable computer 12. For example, the guitarist may be able to download a new pedal or an update to a previously stored pedal onto the portable computer 12. The internet capability associated with the programmable multi-effects unit (or programmable pedalboard) also provides for an on-line community where a guitarist may share presets (e.g., banks 54 and/or tones 56), loops, and song recordings with other guitarists. In one example, this may be advantageous for the guitarist who develops a new rhythm (e.g., "guitar lick") using a particular custom user preset and would like to share the preset or a recorded version of the new rhythm to a band mate who is geographically separated from the guitarist. The internet capability may also enable a teacher and student to engage in a guitar lesson even if the teacher is physically located at a different location than the student. The lesson may be performed in real-time. Or, a musician may submit a section of recorded guitar (e.g., a "loop"), for example, and other remotely-located musicians may listen to the loop, play on top of it, and submit his/her loop or the composite loop for others to which they can then listen or contribute, and so forth. The loop originator, or other designee, may be in control of edits to the composite loop, either accepting or rejecting subsequent contributions to the loop. The portable computer may be configured with software to utilize online loop sharing with a community of musicians. Furthermore, sheet music (or tablature) may be downloaded onto the portable computer 12. While the guitarist plays a song based on the sheet music or tablature, the portable computer 12 may critique how well such a song is played. For example, the portable computer 12 may record the guitar while the tablature scrolls across the screen and compare the notes selected by the guitarist against the tablature to provide a score (or to critique) on how well the guitarist is playing the guitar in comparison to the tablature.

Various lyrics can be downloaded to the portable computer 12 to enable the guitarist to sing the correct lyrics as the lyrics scroll across the display 16. In addition, the portable computer 12 may enable a minus track feature in which various instruments or vocals may be stripped from a song. For example, the portable computer 12 may enable the guitarist to remove a guitar track from a song via the user interface 38 so that the guitarist plays or fills in the guitar track while vocals, drums, and bass tracks for the particular song are played back. A forward facing camera may be positioned on the docking station 14 to record video of the guitarist playing. The video (in real time or delay) may be uploaded onto YouTube® or other suitable playback mechanism to provide a personal feed of the guitarist playing. Various switches (e.g., foot switches) positioned on the docking station 14 may be used to start/stop recording as needed by toggling the foot switch on the docking station 14 as the guitarist plays a song. In addition, the portable computer 12 may execute videos for lessons, learning a new "lick of the day", etc.

The portable computer 12 may have a set list downloaded in advance to a gig or it may be wirelessly transmitted during the gig to capture any changes made to the set list while the show is on-going. The guitarist can view any updates to the set list on the display 16 as they occur in real-time. In addition, the guitarist may assign various pedals 44, banks 54, and tones 56 via the portable computer 12 to a particular song in the set list such that during a live show, these presets are automatically turned on for each song in the set list. The portable computer 12 may also enable the guitarist to pre-load backing tracks and to assign each backing track to a particular song. Further, the portable computer 12 may also enable the guitarist to control other affects such as a siren or lights to be turned on for a particular song. For example, the portable computer 12 may transmit a wired or wireless command to another device to initiate a particular lighting sequence or turn on a siren at the beginning of the song for a particular song in the set list.

The portable computer 12 may also receive firmware updates and provide such updates for the docking station 14. The portable computer 12 may also support various integrated controls of various apps. For example, the portable computer 12 may launch various software applications such as, but not limited to, Apple® Garage Band® with a single switch (or button). In this case, the guitarist may automate a number of the steps needed to record a guitar track as provided by such software application and simply press a single button (either on the portable computer 12 (for hand selection) and/or on the docking station 14 (for foot selection)) to immediately start recording a guitar track. In many cases, a guitarist may just start playing a guitar lick and realize that he/she wants to record this lick on the fly. However, some of the software packages may require multiple steps to be performed prior to recording. In this case, the portable computer 12 may enable the guitarist to run a macro so that such operations are instantaneously performed via the push of a button on the user interface 38 or on the docking station 14 to record a particular lick. This can be performed dynamically or as needed so that the guitarist is not interrupted in setting up the recording feature when he/she comes across a particular rhythm while playing the guitar that is found appealing for recording purposes. Further, such recorded tracks can be sent via the software application (e.g., Garage Band®) directly through the portable computer 12 to a server or other device, such as for example, a teacher or band mate of the guitarist.

The portable computer 12 may also receive push notifications for notifying the guitarist of opportunities to purchase various apps (e.g., a particular effect) for a limited time offer, or to notify the guitarist of available firmware updates. The portable computer 12 may also include an integrated user manual or help manual for the docking station 14 and computer application. The portable computer 12 and/or the docking station 14 may also support hands free selection of one or more of the features disclosed herein via voice recognition.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. An apparatus for a musical instrument, the apparatus comprising:

a portable computer including an interface being arranged to provide a plurality of instrument effects that is operably coupled to a docking station that receives an audio signal from a musical instrument and that modifies the audio signal from the musical instrument based on one or more of the plurality of instrument effects, the portable computer being configured to provide a plurality of first switches on the interface, each first switch being configured to one of activate and deactivate an instrument effect from the plurality of instrument effects, wherein the portable computer is further configured to provide an amplifier selection field to enable a user to select an amplifier of interest that simulates a particular sound provided by the amplifier of interest, and wherein the portable computer is further configured to provide a plurality of second switches, each second switch being configured to one of activate and deactivate a musical tone associated with one of a plurality of banks.

2. The apparatus of claim 1 wherein the portable computer is further configured to wirelessly transmit data of the instrument effect being one of activated and deactivated to the docking station.

3. The apparatus of claim 1 wherein the portable computer is further configured to wirelessly receive data of the instrument effect being one of activated and deactivated from the docking station.

4. The apparatus of claim 3 wherein the portable computer is further configured to generate a visual indicator to a user to indicate that the instrument effect has been activated in response to the data transmitted from the docking station.

5. The apparatus of claim 1 wherein the portable computer is further configured to provide various knobs within the amplifier selection field to control at least one of gain, bass, middle and treble for the selected amplifier of interest.

6. The apparatus of claim 1 wherein the portable computer is further configured to provide an amplifier cabinet selection field to enable a user to select a cabinet that simulates a particular sound provided by a speaker in the cabinet.

7. The apparatus of claim 1 wherein the portable computer is further configured to wirelessly transmit data indicative of the musical tone being one of activated and deactivated to the docking station.

8. The apparatus of claim 1 wherein the interface of the portable computer is configured to enable a user to drag and drop any one or more of the plurality of instrument effects in any order thereof.

9. The apparatus of claim 1 wherein the interface of the portable computer is configured to enable a user to remove one or more musical instrument tracks from a song such that the user provides a first audio signal for one or more removed musical instrument tracks with the musical instrument.

10. The apparatus of claim 1 wherein the portable computer is removably coupled to the docking station.

11. An apparatus for a musical instrument, the apparatus comprising:

a portable computer including an interface being arranged to provide a plurality of instrument effects that is capable of being received at a docking station that receives an audio signal from a musical instrument and that modifies the audio signal from the musical instrument based on one or more of the plurality of instrument effects, the portable computer being configured to electrically communicate with the docking station and to provide a plurality of first switches on the interface, each first switch being configured to one of activate and deactivate an instrument effect from the plurality of instrument effects, wherein the portable computer is further configured to provide an amplifier selection field to enable a user to select an amplifier of interest that simulates a particular sound provided by the amplifier of interest, and wherein the interface of the portable computer is configured to enable a user to drag and drop any one or more of the plurality of instrument effects in any order thereof.

12. The apparatus of claim 11 wherein the portable computer is further configured to wirelessly transmit data of the instrument effect being one of activated and deactivated to the docking station.

13. The apparatus of claim 11 wherein the portable computer is further configured to wirelessly receive data of the instrument effect being one of activated and deactivated from the docking station.

14. The apparatus of claim 13 wherein the portable computer is further configured to generate a visual indicator to a user to indicate that the instrument effect has been activated in response to the data transmitted from the docking station.

15. The apparatus of claim 11 wherein the portable computer is further configured to provide various knobs within the amplifier selection field to control at least one of gain, bass, middle, and treble for the selected amplifier of interest.

16. The apparatus of claim 11 wherein the portable computer is further configured to provide an amplifier cabinet selection field to enable a user to select a cabinet that simulates a particular sound provided by a speaker in the cabinet.

17. An apparatus for a musical instrument, the apparatus comprising:

a portable computer including an interface being arranged to provide a plurality of guitar effects that is operably coupled to a docking station that receives an audio signal from a guitar and that modifies the audio signal from the guitar based on one or more of the plurality of guitar effects, the portable computer being configured to provide a plurality of switches on the interface, each switch being configured to one of activate and deactivate a guitar effect from the plurality of guitar effects, wherein the interface of the portable computer is configured to enable a user to drag and drop any one or more of the plurality of guitar effects in any order thereof.

18. An apparatus for a musical instrument, the apparatus comprising:

a portable computer including an interface being arranged to provide a plurality of instrument effects that is operably coupled to a docking station that receives an audio signal from a musical instrument and that modifies the audio signal from the musical instrument based on one or more of the plurality of instrument effects, the portable computer being configured to provide a plurality of first switches on the interface, each first switch being configured to one of activate and deactivate an instrument effect from the plurality of instrument effects, wherein the portable computer is further configured to provide a plurality of second switches, each second switch being configured to one of activate and deactivate a musical tone associated with one of a plurality of banks.

19. An apparatus for a musical instrument, the apparatus comprising:

a portable computer including an interface being arranged to provide a plurality of instrument effects that is operably coupled to a docking station that receives an audio signal from a musical instrument and that modifies the audio signal from the musical instrument based on one or more of the plurality of instrument effects, the portable computer being configured to provide a plurality of first switches on the interface, each first switch being configured to one of activate and deactivate an instrument effect from the plurality of instrument effects, wherein the interface of the portable computer is configured to enable a user to drag and drop any one or more of the plurality of instrument effects in any order thereof.

20. An apparatus for a musical instrument, the apparatus comprising:

a portable computer including an interface being arranged to provide a plurality of instrument effects that is operably coupled to a docking station that receives an audio signal from a musical instrument and that modifies the audio signal from the musical instrument based on one or more of the plurality of instrument effects, the portable computer being configured to provide a plurality of first switches on the interface, each first switch being configured to one of activate and deactivate an instrument effect from the plurality of instrument effects, wherein the interface of the portable computer is configured to enable a user to remove one or more musical instrument tracks from a song to provide a first audio signal for one or more removed musical instrument tracks with the musical instrument.

21. An apparatus for a musical instrument, the apparatus comprising:

a portable computer including an interface being arranged to provide a plurality of instrument effects that is capable of being received at a docking station that receives an audio signal from a musical instrument and that modifies the audio signal from the musical instrument based on one or more of the plurality of instrument effects, the portable computer being configured to electrically communicate with the docking station and to provide a plurality of first switches on the interface, each first switch being configured to one of activate and deactivate an instrument effect from the plurality of instrument effects, wherein the portable computer is further configured to provide an amplifier cabinet selection field to enable a user to select a cabinet that simulates a particular sound provided by a speaker in the cabinet, and wherein the interface of the portable computer is configured to enable a user to remove one or more musical instrument tracks from a song to provide a first audio signal for one or more removed musical instrument tracks with the musical instrument.

* * * * *